United States Patent [19]

Yosioka et al.

[11] 3,942,088
[45] Mar. 2, 1976

[54] PROPORTIONAL-INTEGRAL CIRCUIT HAVING MEANS FOR CHANGE-OVER BETWEEN AUTOMATIC MODE AND HANDLING MODE

[75] Inventors: Takayuki Yosioka; Tadashi Komada; Akira Sugano; Takafumi Fukumaru, all of Hitachi, Japan

[73] Assignee: Hitachi, Ltd., Japan

[22] Filed: Sept. 3, 1974

[21] Appl. No.: 502,878

[30] Foreign Application Priority Data
Sept. 5, 1973   Japan................................ 48-99267

[52] U.S. Cl................................ 318/591; 318/609
[51] Int. Cl.² .......................................... G05B 7/00
[58] Field of Search............................ 318/591, 609

[56] References Cited
UNITED STATES PATENTS

| | | | |
|---|---|---|---|
| 3,523,193 | 8/1970 | Hutcheon | 318/591 |
| 3,576,535 | 4/1971 | Turner | 318/591 |
| 3,662,276 | 5/1972 | Hyer | 318/591 |
| 3,725,762 | 4/1973 | Levesque | 318/591 |
| 3,772,602 | 11/1973 | Kobayashi | 318/591 |
| 3,826,991 | 7/1974 | Hogan | 318/591 |
| 3,882,368 | 5/1975 | Carleton | 318/591 |

*Primary Examiner*—Robert K. Schaefer
*Assistant Examiner*—John J. Feldhaus
*Attorney, Agent, or Firm*—Craig & Antonelli

[57] ABSTRACT

A proportional-integral circuit comprising a proportional element, an integrator and an adder. In an automatic mode, the proportional element delivers an output signal $V_P$ which is proportional to an input signal $V_i$, the integrator delivers an output signal $V_I$ by integrating the input signal $V_i$, and the adder delivers an output signal $V_{PI}$ which is the sum of the output $V_P$ of the proportional element and the output $V_I$ of the integrator. In a handling mode, the input signal $V_i$ is not applied to the integrator, and the output $V_P$ of the proportional element and an output $V_H$ of a manual handling source are applied to the integrator. A resistor is connected in parallel with a feedback capacitor in the integrator so that the integrator possesses an adding function. The adder adds up the output $V_P$ of the proportional element and the output $V_I$ of the integrator. Further, in this circuit, the gain of the integrator output $V_I$ relative to $V_P$ and $V_H$ is selected to be $1/n$, and the gain of the adder output $V_{PI}$ relative to $V_I$ is selected to be $n$.

4 Claims, 8 Drawing Figures

PROPORTIONAL-INTEGRAL CIRCUIT HAVING MEANS FOR CHANGE-OVER BETWEEN AUTOMATIC MODE AND HANDLING MODE

BACKGROUND OF THE INVENTION

This invention relates to a proportional-integral circuit widely used as a controller incorporated in various control devices. More particularly, this invention relates to a proportional-integral circuit which is composed of a proportional element for obtaining a signal $V_P$ proportional to an input signal $V_i$, an integrator for obtaining an integrated signal $V_I$ by integrating the input signal $V_i$, and an adder for obtaining the sum of the output $V_P$ of the proportional element and the output $V_I$ of the integrator. More specifically, this invention relates to a proportional-integral circuit of the kind above described which is used for automatically controlling a controlled system according to the output of the proportional-integral circuit (hereinafter referred to as an automatic mode) and for manually controlling the controlled system according to the output of a manual handling source provided at the output end of the adder (hereinafter referred to as a handling mode), and in which means for changing over between the automatic mode and the handling mode is provided so that the handling mode can be bumplessly changed over to the automatic mode without imparting any shock to the controlled system.

As described above, a proportional-integral circuit is composed of a proportional element for obtaining a signal $V_P$ proportional to an input signal $V_i$, an integrator for obtaining an integrated signal $V_I$ by integrating the input signal $V_i$, and an adder for obtaining the sum $V_{PI}$ of $V_P$ and $V_I$. A manual handling source producing an output $V_H$ is provided at the output end of the adder. In the automatic mode, a controlled system is controlled according to the output $V_{PI}$ of the adder, and the output $V_H$ of the manual handling source follows up the output $V_{PI}$ of the adder.

When the automatic mode is changed over to the handling mode, the output $V_H$ of the manual handling source is applied to the controlled system in lieu of the adder output $V_{PI}$. Since $V_{PI} = V_H$ in the automatic mode, changeover from the automatic mode to the handling mode can be attained in bumpless fashion. Considering subsequent change-over from the handling mode to the automatic mode again, it is necessary that the adder output $V_{PI}$ should follow up the output $V_H$ of the manual handling source in the handling mode.

In order to ensure bumpless change-over from the handling mode to the automatic mode in a state as above described, the proportional-integral circuit is arranged to operate in a manner as described below in the handling mode. In the handling mode, an input signal $V_i$ is applied to the proportional element to obtain a signal $V_P$ proportional to the input signal $V_i$. A resistor is connected in parallel with an integrating capacitor in the integrator so that the integrator possesses an adding function. The input signal $V_i$ is not applied to the integrator, and the ouput $V_p$ of the proportional element and the output $V_H$ of the manual handling source are applied to the integrator to obtain the sum of $V_P$ and $V_H$. The adder computes the sum $V_{PI}$ of the output $V_P$ of the proportional element and the output $V_I$ of the integrator. Since, in this case, the integrator output $V_I$ consists of the proportional component $V_P$ and the output $V_H$ of the manual handling source, the output $V_{PI}$ of the adder can follow up the output $V_H$ of the manual handling source when $V_P$ included in the integrator output $V_I$ and $V_P$ obtained by the proportional element cancel each other.

This is carried out, for example, in a manner as described below. The proportional element is composed of an input resistor of resistance value $R_1$ through which $V_i$ is applied, a first operational amplifier A1, and a feedback resistor of resistance value $R_2$ connected in parallel with the operational amplifier A1. The integrator is composed of an input resistor of resistance value $R_3$ through which $V_i$ is applied, a second operational amplifier A2, and an integrating capacitor of capacitance value C connected in parallel with the operational amplifier A2. The adder is composed of an input resistor of resistance value $R_7$ through which proportional element output $V_P$ is applied, another input resistor of resistance value $R_8$ through which integrator output $V_I$ is applied, a third operational amplifier A3, and a feedback resistor of resistance value $R_9$ connected in parallel with the operational amplifier A3. In the handling mode, a feedback resistor of resistance value $R_5$ is connected in parallel with the second operational amplifier A2 to provide the adding function to the integrator. It is supposed that an input resistor for applying $V_P$ to the integrator in the handling mode has a resistance value $R_4$, and an input resistor for applying $V_H$ to the integrator in the handling mode has a resistance value $R_6$.

The relations among the resistance values of the resistors above described are as follows:

$$R_4 = R_5 = R_6 \tag{1}$$

$$R_7 = R_8 = R_9 \tag{2}$$

$$\frac{V_P}{V_i} = \frac{R_2}{R_1} = K_P \tag{3}$$

$K_P$ in the equation (3) is the proportional gain of the output $V_P$ of the proportional element relative to the input signal $V_i$. Due to the fact that the resistance values of the individual resistors are selected to provide the relations above described, the output $V_P$ of the proportional element is given by the equation (4), but the sign is inverted since the output appears from the operational amplifier. The output $V_I$ of the integrator and the ouput $V_{PI}$ of the adder in the handling mode are respectively given by the equations (5) and (6).

$$V_P = -\frac{R_2}{R_1}V_i = -K_P V_i \tag{4}$$

$$V_I = -\frac{R_5}{R_4}V_P - \frac{R_5}{R_6}V_H = K_P V_i - V_H \tag{5}$$

$$\begin{aligned} V_{PI} &= -\frac{R_9}{R_7}V_P - \frac{R_9}{R_8}V_I = -V_P - V_I \\ &= -(-K_P V_i) - (K_P V_i - V_H) \\ &= K_P V_i - K_P V_i + V_H = V_H \end{aligned} \tag{6}$$

The equation (5) represents the output of the integrator, and the resistor $R_5$ is connected in parallel with the capacitor C in order that the integrator can possess the adding function in the handling mode. This circuit structure of the integrator in the handling mode is commonly called a first order lag circuit. Therefore, this circuit has a time constant T ($T = CR_5$) determined by C and $R_5$. The equation (5) indicates the output of the integrator in the state in which the circuit is stabilized with lapse of time greater than the time constant $T$.

It is seen from the above description that change-over from the handling mode to the automatic mode can be performed in bumpless fashion when the resistance values of the resistors associated with the operational amplifiers are selected to satisfy the equations (1) and (2).

In the above description, however, saturation of the operational amplifiers is not taken into account, and the relation given by the equation (6) does not hold when the operational amplifiers are saturated. This point will be discussed while taking actual numerical values. The values of $V_i$ and $V_H$ are generally $\pm 10$ volts, and the saturation voltage of the operational amplifiers in this case is generally $\pm 12$ volts. Therefore, in the case of the integrator which is most easily saturated, the relation between $V_H$ and $V_i$ must satisfy the inequality (7).

$$-12 \text{ (v)} < K_P V_i - V_H < +12 \text{ (v)} \tag{7}$$

In the inequality (7), $V_i$ and $V_H$ take any suitable value within the range of $+12$ volts and $-12$ volts. Suppose that $V_H$ is $-8$ volts, then the integrator saturates when $K_P V_i$ is greater than 4 volts. In such a case, $V_i$ which provides the output of the proportional element is not equal to $V_i$ included in the output $V_I$ of the integrator, and the output $V_{PI}$ of the adder is not equal to the output $V_H$ of the manual handling source. When the handling mode is changed over to the automatic mode under such a condition, a shock may be imparted to the controlled system due to the difference between $V_H$ and $V_{PI}$, and bumpless change-over from the handling mode to the automatic mode may not be attained.

It will thus be seen that obstruction against bumpless change-over from the handling mode to the automatic mode due to saturation of the operational amplifiers in the proportional-integral circuit is extremely inconvenient and undesirable from the standpoint of handling. Further, this provides considerable restrictions on the application of the proportional-integral circuit to actual plants. Therefore, such restrictions must be eliminated by employing suitable means which satisfies both the condition required for fulfilling the function of the proportional-integral circuit and the condition required for the bumpless change-over.

SUMMARY OF THE INVENTION

It is an object of the present invention to provide a proportional-integral circuit which is composed of a proportional element, an integrator and an adder, which is provided with means for changing over between the automatic mode and the handling mode, and which satisfies the condition required for fulfilling the proportional-integral control function.

Another object of the present invention is to provide a proportional-integral circuit of the above character which satisfies further condition required for the bumpless change-over between the automatic mode and the handling mode.

Still another object of the present invention is to provide a proportional-integral circuit of the above character which is provided with a limiter for preventing saturation of operational amplifiers in the proportional-integral circuit.

According to the present invention, the gain of the output $V_I$ of the integrator relative to the inputs $V_P$ and $V_H$ in the handling mode is selected to be $1/n$, and the gain of the output $V_{PI}$ of the adder relative to the output $V_I$ of the operational amplifier A2 is selected to be $n$. Thus, the region of the signal voltage that can be used in bumpless change-over can be enlarged to the maximum allowable value in the normal operation. Further, in order that the adder may not be undesirably saturated in the automatic mode due to the gain n of the output $V_{PI}$ of the adder relative to the input $V_I$, a limiter is connected across the input terminal of the integrator and the output terminal of the adder so as to prevent saturation of the proportional-integral circuit.

Figure 1:
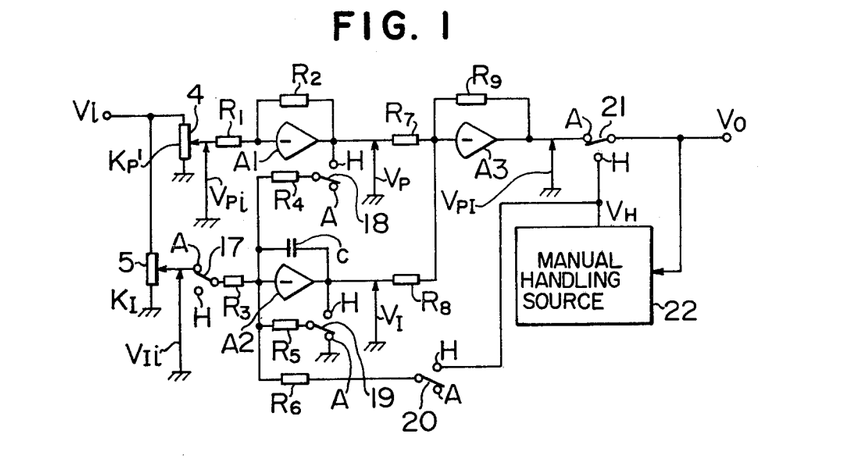
FIG. 1 is a circuit diagram showing the general structure of a proportional-integral circuit according to the present invention.

FIG. 1 is a circuit diagram showing the general structure of a proportional-integral circuit according to the present invention. Referring to FIG. 1, this proportional-integral circuit comprises a proportional element for obtaining a signal $V_P$ proportional to an input signal $V_i$, an integrator for obtaining a signal $V_I$ by integrating the input signal $V_i$, and an adder for obtaining the sum $V_{PI}$ of $V_P$ and $V_I$. A potentiometer 4 is provided for setting the proportional gain $KP$ of the output $V_P$ of the proportional element relative to the input signal $V_i$. Another potentiometer 5 is provided for setting the integrating time constant of the output $V_I$ of the integrator relative to the input signal $V_i$. The symbols A1 to A3 designate operational amplifiers such as those described hereinbefore. The symbols $R_1$ to $R_9$ designate operational resistors such as those described hereinbefore, and the resistor $R_1$, for example, has a resistance value $R_1$. A plurality of switches 17, 18, 19, 20 and 21 are provided for effecting change-over between the handling mode and the automatic mode. These switches 17, 18, 19, 20 and 21 are closed at contacts H in the handling mode and at contacts A in the automatic mode. A manual handling source 22 delivers an output $V_H$ which follows up the output $V_{PI}$ of the adder in the automatic mode.

Figure 2:
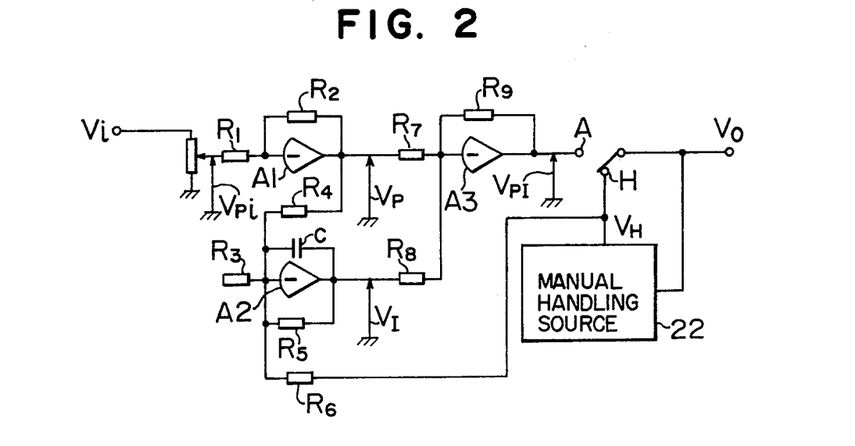
FIG. 2 is a view similar to FIG. 1 but showing the circuit state when contacts for changing over between the handling mode and the automatic mode are closed to establish the handling mode.

FIG. 2 shows the state of the proportional-integral circuit of FIG. 1 when the handling mode is selected by actuating the switches 17 to 21. In FIGS. 1 and 2, the proportional element is composed of the potentiometer 4, operational resistors $R_1$ and $R_2$, and operational amplifier A1. This operational amplifier A1 is used principally for inverting the polarity of the signal. The integrator is composed of the operational resistor $R_3$, feedback capacitor C, operational amplifier A2 and potentiometer 5. The adder is composed of the operational resistors $R_7$, $R_8$ and $R_9$ and operational amplifier A3. The resistor $R_5$ serves as a feedback resistor so that the integrator possesses an adding function in the handling mode. The resistors $R_4$ and $R_6$ serve as input resistors through which the output $V_P$ of the proportional element and the output $V_H$ of the manual handling source are applied to the integrator in the handling mode. Thus, in the handling mode, the integrator has a circuit structure which is commonly called a first order lag circuit. Therefore, the integrator has a time constant T ($T = CR_5$) determined by the resistance of the resistor $R_5$ and the capacitance of the feedback capacitor C.

In the proportional-integral circuit of the present invention having such a structure, the gain of the output voltage $V_I$ of the integrator relative to the input voltage $V_P$ applied from the proportional element and the input voltage $V_H$ applied from the manual handling source 22 in the handling mode is selected to be $1/n$ in order to satisfy the condition required for bumpless change-over. It is to be noted however that what is called the gain of the integrator herein means the relation between the input and the output after the lapse of time greater than the time constant ($T = CR_5$) of the first order lag circuit above described. Further, the gain of the output $V_{PI}$ of the adder relative to the input $V_I$ applied from the integrator is selected to be n. This n may be any suitable number which is greater than unity ($n > 1$). In the following description, n is selected to be 2 ($n = 2$) for convenience of explanation.

The relations among the resistance values of the operational resistors are as follows when $n = 2$ in FIGS. 1 and 2:

$$R_4 = R_6 = 2R_5 \tag{8}$$

$$R_7 = R_9 = 2R_8 \tag{9}$$

$$\frac{V_{PI}}{V_I} = K_P' \tag{10}$$

$$\frac{V_P}{V_i} = \frac{R_2}{R_1}K_P' = K_P \tag{11}$$

In the equations (10) and (11), $V_{Pi}$ is the input voltage of the proportional element, that is, the output voltage of the potentiometer 4, and $K_p'$ is the gain of the output $V_{Pi}$ of the potentiometer 4 relative to the input signal $V_i$.

The outputs $V_P$, $V_I$ and $V_{PI}$ of the proportional element, integrator and adder in the handling mode are as follows:

$$V_P = -K_P V_i \tag{12}$$

$$V_I = -\frac{R_5}{R_4}V_P - \frac{R_5}{R_6}V_H = -\frac{V_P}{2} - \frac{V_H}{2}$$

$$= \frac{K_P V_i}{2} - \frac{V_H}{2} \tag{13}$$

$$V_{PI} = -\frac{R_9}{R_7}V_P - \frac{R_9}{R_8}V_I$$

$$= K_P V_i - 2\left(\frac{K_P V_i}{2} - \frac{V_H}{2}\right) = V_H \tag{14}$$

Thus, when the resistance values of the operational resistors are determined to give relations as shown in the equations (8) to (11), it is theoretically possible to attain bumpless change-over from the handling mode to the automatic mode as will be seen in the equations (12) to (14). It is to be noted however that the equation (13) represents the relation between the input and the output in the state in which the first order lag circuit is stabilized after lapse of time greater than the time constant $T (T = CR_5)$ of the first order lag circuit.

In FIGS. 1 and 2, the symbol "—" is affixed to the operational amplifiers A1, A2 and A3 to indicate that they are inverting operational amplifiers. Namely, the output signal varies in a polarity which is opposite to that of the varying input signal.

Now turning back to the proportional-integral circuit, let us consider what is meant by the proportional-integral function of the circuit. Briefly speaking, this function means that a deviation in proportional component has the same polarity with a deviation in integral component. In other words, the integral component must increase with an increase in the proportional component. On the other hand, the case, where the deviation in proportional component and that in integral component have the opposite polarity, is not called proportional-integral function, and seldom used for controllers in actual plants. Accordingly, for example, a pair of inverting operational amplifiers may be employed as operational amplifiers A1 and A2. In this case, in order that the polarity of output $V_H$ of the manual handling source 22 is made the same with that of output $V_{PI}$ of the adder, the operational amplifier A3 is also required to be an inverting operational amplifier.

However, since the proportional-integral function is defined as mentioned above, a similar circuit may be made employing non-inverting operational amplifiers. The non-inverting operational amplifier means herein an operational amplifier whose input and output have the same polarity. In the case of employing such a non-inverting operational amplifier to construct a proportional-integral circuit, the non-inverting operational amplifiers may be employed as the amplifiers A1 and A3, but an inverting operational amplifier must be employed as the amplifier A2 since an integral circuit cannot be constructed by a non-inverting operational amplifier. In such a circuit, the output of the integrator is inverted and then applied to the amplifier A3 to perform the proportional-integral function and to effect satisfactorily the bumpless changeover between automatic mode and handling mode. Further, in such a circuit, a handling mode can be carried out by inverting the polarity of the output of the proportional element and by applying the thus inverted output to the amplifier A2.

As is apparent from the above-mentioned description, a proportional-integral circuit may readily and unrestrictedly be constructed by inverting and non-inverting operational amplifiers. In such a circuit, however, it is important to satisfy the conditions that, in a handling mode, the output $V_P$ of the proportional element and the proportional component contained in the output of the integrator have the opposite polarity, and the output of the proportional-integral circuit agrees with the output of the manual handling source.

The present invention is applicable to any proportional-integral circuit capable of satisfying the above-mentioned conditions.

Saturation of the operational amplifiers will next be considered. Suppose that the input signal $V_i$ and the output $V_H$ of the manual handling source are set to lie within the range of from +10 volts to −10 volts. Suppose further that the saturation voltage of the operational amplifiers is ±12 volts. The range in which the equation (12) holds will now be discussed to obtain a relation similar to that given by the inequality (7).

$$-12\,(v) < \left(V_I = \frac{\pm 12}{2} - \frac{\mp 10}{2} = \pm 11\,(v)\right) < +12\,(v) \qquad (14)$$

The inequality (14) represents the severest condition in which the saturation of the operational amplifier A2 in the integrator is taken into account, that is, the condition in which the operational amplifier A1 is saturated to deliver +12 volts. Even in this severest condition, the maximum (minimum) value of the output $V_I$ is ±11 volts and the operational amplifier A2 is not saturated. Therefore, the equations (12) and (13) hold within the range of all the values of $V_H$ and $V_i$. It will thus be understood that, according to the circuit of the present invention, the operational amplifier A2 does not saturate, and bumpless change-over from the handling mode to the automatic mode can be reliably attained. Thus, the condition required for the bumpless change-over is satisfied.

On the other hand, in the automatic mode, the circuit of FIG. 1 is changed over in such a manner that the output $V_P$ of the proportional element and the output $V_I$ of the integrator are applied to the adder which seeks the sum $V_{PI}$ of $V_P$ and $V_I$. The output voltages of the respective operational amplifiers in this mode are as follows:

$$V_P = -K_P V_i \qquad (15)$$

$$V_I = -\frac{K_I V_i}{CR_3 S} \qquad (16)$$

$$V_{PI} = -V_P - 2V_I = \left(K_P + \frac{1}{T_I S}\right) V_i \qquad (17)$$

In the equations (15) to (17), S is the Laplace's operator, $K_I$ is the voltage division ratio of the potentiometer 5, and $T_I$ is the integrating time constant. This time constant $T_I$ is given by $$T_I = \frac{CR_3}{2K_I} \qquad (18)$$

The operation of the proportional-integral circuit in the automatic mode will now be described. According to the present invention, the resistance values of the operational resistors are selected to provide the relations shown in the equation (8) or (9) so as to always satisfy the relation of the equation (13) in the handling mode. Consequently, the output $V_I$ of the integrator is doubled and $2V_I$ is applied to the adder as shown in the equation (17). Suppose that the saturation voltage of the operational amplifiers A1, A2 and A3 is ±12 volts as described hereinbefore and consider the effect of $V_I$ alone in the automatic mode without considering the effect of the output $V_P$ of the proportional element. In the automatic mode, the operational amplifier A3 starts to saturate at the value of $V_I$ of ±6 volts. Thus, in spite of the fact that the output voltage $V_{PI}$ of the operational amplifier A3 is variable up to the saturation voltage ±12 volts, the operational amplifier A3 may be saturated within the range of $V_I$ of from +6 volts to +12 volts and from −6 volts to +12 volts and a region may be produced in which no change occurs in the output voltage $V_{PI}$ of the operational amplifier A3. This provides a great disadvantage in automatic process control and a limiter is required for preventing this undesirable saturation.

However, due to the fact that $V_I$ is variable up to the maximum (minimum) of ±11 volts in the handling mode as described with reference to the equation (14), mere limitation of the output voltage $V_I$ of the operational amplifier A2 to ±6 volts is not sufficient.

The operational amplifier A3 tends to saturate since $V_I$ is doubled and $2V_I$ is applied to the adder as above described. To eliminate the tendency of the operational amplifier A3 toward saturation, a limiter is provided in the present invention and is connected across the input terminal of the operational amplifier A2 which is the essential part of the integrator and the output terminal of the operational amplifier A3 which is the essential part of the adder.

Figure 3:
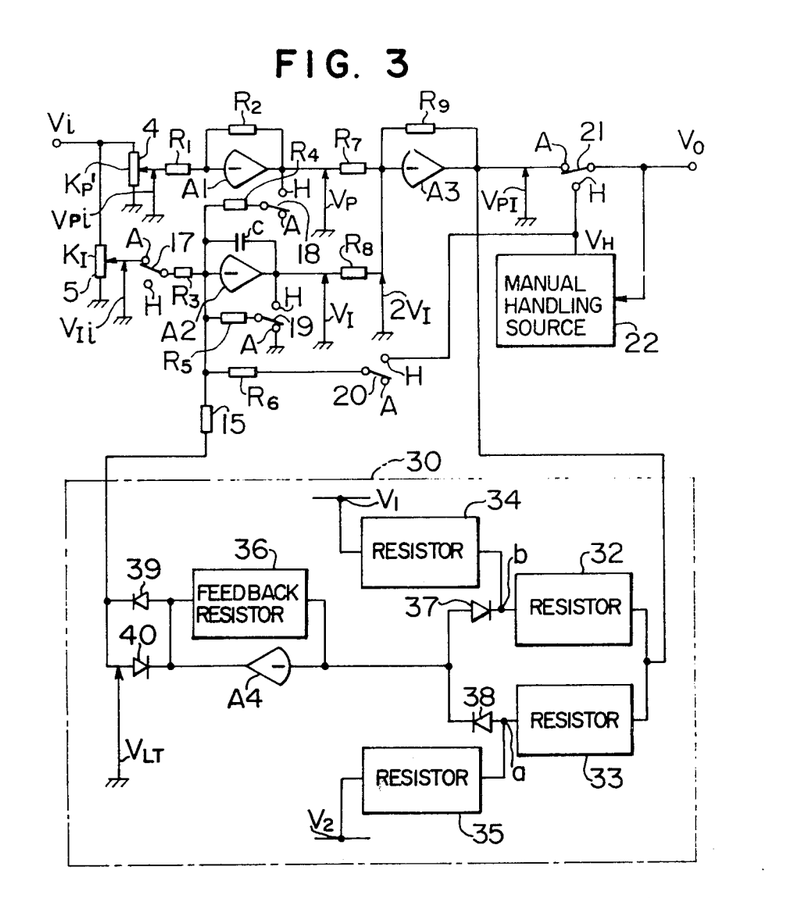
FIG. 3 is a circuit diagram showing the structure of an embodiment of the present invention provided with a limiter.

FIG. 3 shows an embodiment of the present invention which is provided with such a limiter. In FIG. 3, like reference numerals are used to denote like parts appearing in FIGS. 1 and 2.

The operation of this limiter 30 will be described with reference to FIG. 3. An output voltage $V_{PI}$ of an operational amplifier A3 is compared with a positive reference voltage $V_1$ and a negative reference voltage $V_2$. Referring to FIG. 3, the potential difference between the output voltage $V_{PI}$ of the operational amplifier A3 and the positive reference voltage $V_1$ is divided by a pair of resistors 32 and 34. Similarly, the potential difference between $V_{PI}$ and the negative reference voltage $V_2$ is divided by another pair of resistors 33 and 35. A diode 37 conducts when the potential at the connection point $b$ between the resistors 32 and 34 becomes negative. Another diode 38 conducts when the potential at the connection point $a$ between the resistors 33 and 35 becomes positive. The limiter 30 includes an operational amplifier A4 and a feedback resistor 36 for the operational amplifier A4 and so that the polarity of the limiter signal obtained through the diode 37 and 38 is inverted by the operational amplifier A4. The output of the operational amplifier A4 is applied through diodes 39 and 40 and a resistor 15 to the input terminal of an operational amplifier A2 which is the essential part of an integrator. The diodes 39 and 40 are provided so as to block reverse leakage current of the diode 37 or 38 as described later. Suppose that the limiter is actuated when $V_{PI}$ attains the level of ±11 volts, then $V_1$ and $V_2$ may be selected to be +22 volts and −22 volts respectively, and the resistance values of the resistors 34 and 35 may be selected to be two times those of the resistors 32 and 33 respectively.

The operation of the limiter having such a structure will be considered in regard to the case in which the input voltage applied to the integrator increases in the positive direction resulting in an increase of the output $V_{PI}$ of the adder in the positive direction too. Suppose that the output $V_{PI}$ of the adder increases in the positive direction until it reaches the upper voltage limit +11 volts of the integrator. In this case, the potential at the connection point $a$ between the operational resistors 33 and 35 is positive and current flows through the diode 38. This current acts to vary the output voltage of the operational amplifier A4 in the negative direction so that the operational amplifier A2 is biased through the diode 40 and operational resistor 15 in a direction in which the operational amplifier A2 ceases the integrating operation. On the other hand, when the output voltage $V_{PI}$ of the operational amplifier A3 becomes negative, similar operation is caused by the operational resistors 32 and 34 and diode 37.

Figure 4:
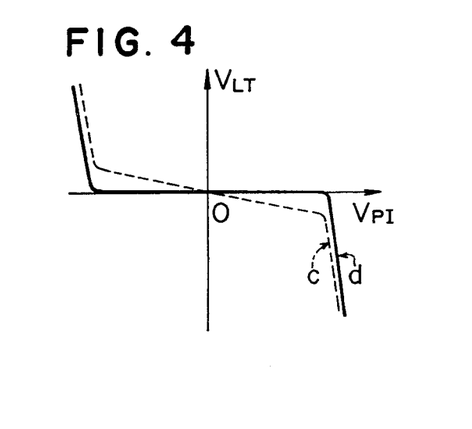
FIG. 4 is a graph showing the operating characteristic of the limiter shown in FIG. 3.

Referring to FIG. 4 showing the operating characteristic of the limiter 30, the output voltage $V_{LT}$ of the operational amplifier A4 is zero as shown by the curve $d$ when $V_{PI}$ is lower than a predetermined positive voltage or higher than a predetermined negative voltage. When $V_{PI}$ exceeds these predetermined voltage limits, $V_{LT}$ increases abruptly to limit the output voltage of the operational amplifier A3 through the operational amplifier A2. Actually, however, $V_{LT}$ of several ten millivolts appears within the range of the predetermined voltage limits as shown by the curve $c$ in FIG. 4 due to reverse leakage current of the diodes 37 and 38. This affects adversely the precision of the integrating operation of the operational amplifier A2. In the embodiment shown in FIG. 3, the diodes 39 and 40 are provided for the purpose of preventing the adverse effect due to this reverse leakage current and obtaining an ideal characteristic as shown by the curve $d$ in FIG. 4.

The operation starting voltage of the limiter 30 is set at such a level that the maximum value thereof does not exceed the saturation voltage of the operational amplifier A3. This operation starting voltage may be selected at, for example ±11 volts so that the operational amplifier A2 can cease the integrating operation before $V_{PI}$ attains the saturation voltage level (which is ±12 volts according to the example described hereinbefore) and the trouble due to saturation can be prevented. Further, due to the fact that resistors $R_8$ and $R_9$ have respective resistance values which satisfy the relation $R_9 = 2R_8$ as described with reference to FIG. 1, the output voltage $V_I$ of the operational amplifier A2 in the automatic mode does not exceed one-half of the limiter voltage of the operational amplifier A3. Further, in the handling mode, the relation between $V_{PI}$ and $V_H$ is $V_{PI} = V_H$. Therefore, the operation starting voltage of the limiter 30 may be set at such a level that the minimum value thereof exceeds $V_H$ which is the output of the manual handling source, so that the operational amplifier A2 can reliably operate free from any adverse effect in both the automatic mode and the handling mode.

Figure 5:
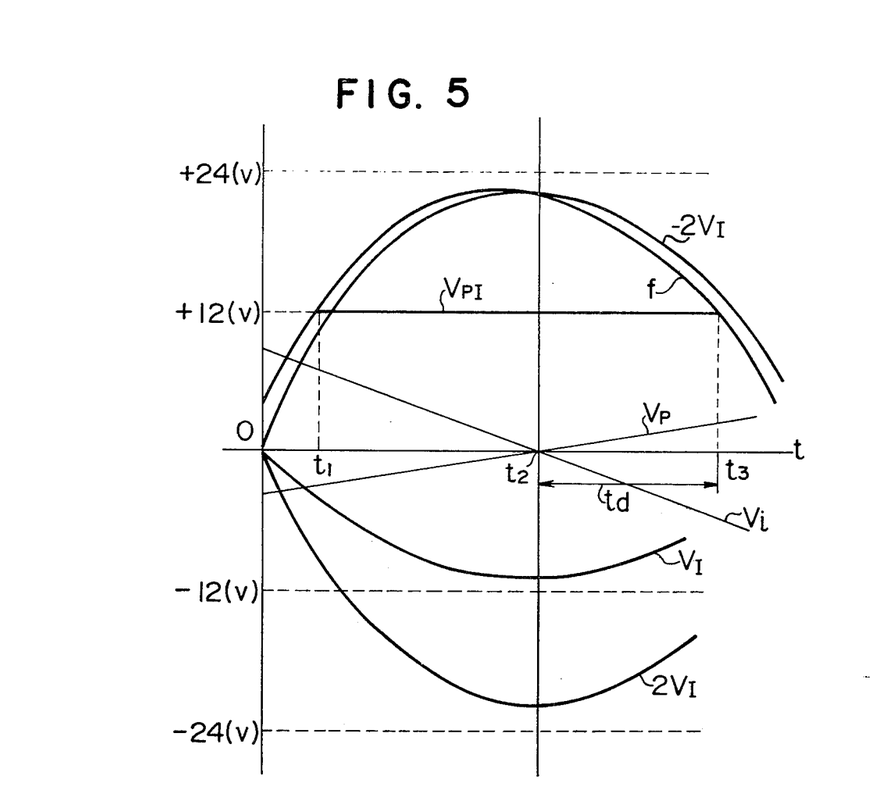
FIG. 5 shows the operating characteristic of the proportional-integral circuit of FIG. 1 which is not provided with the limiter.
Figure 6:
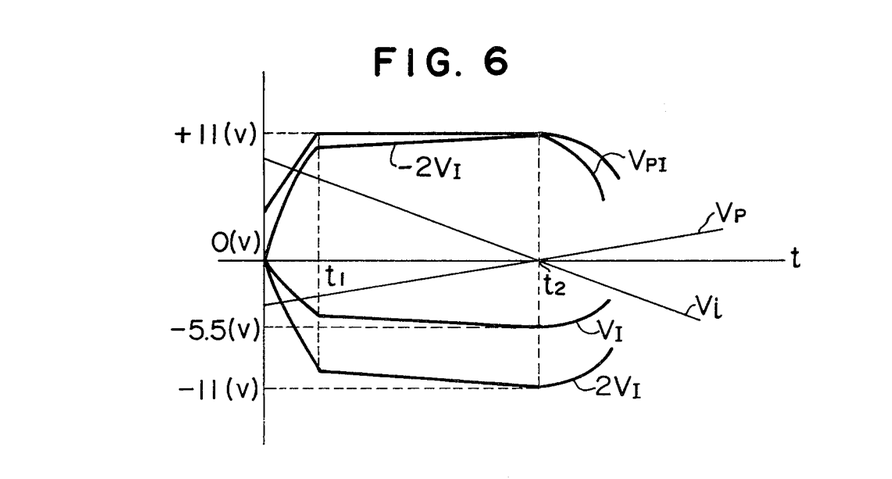
FIG. 6 shows the operating characteristic of the proportional-integral circuit of FIG. 3 which is provided with the limiter.

The operation of the proportional-integral circuit of the present invention in the automatic mode will be described in more detail. At first, the operation of the proportional-integral circuit when applied to automatic process control will be described with reference to FIGS. 5 and 6. FIG. 5 is a waveform diagram for illustrating the operation of the proportional-integral circuit which is not provided with the limiter 30, and FIG. 6 is a waveform diagram for illustrating the operation of the proportional-integral circuit which is provided with the limiter 30. In FIGS. 5 and 6, the horizontal axis represents time $t$, and when an input $V_i$ representative of gradually decreasing controlled deviation is applied to the proportional-integral circuit, the output $V_I$ of the operational amplifier A2 increases due to the integration of the deviation input $V_i$. It is supposed herein that the operational amplifier A3 has an ideal characteristic and is free from saturation. The output voltage $V_{PI}$ of the ideal operational amplifier A3 is $-2V_I$ plus the negative value of the output voltage $V_P$ of the operational amplifier A1, and this value is shown by the curve $f$. In this curve $f$, saturation of the operational amplifier A3 is not taken into account.

Actually, however, no change occurs in the actual output voltage $V_{PI}$ of the adder in the proportional-integral circuit within the range in which the saturation voltage ±12 volts of the operational amplifier A3 is exceeded, that is, between time $t_1$ to time $t_3$ due to the saturation of the operational amplifier A3. This means that, even when the deviation input $V_i$ is reduced to zero at time $t_2$ and is then inverted in polarity, no change occurs in the output voltage $V_{PI}$ until the output voltage of the ideal proportional-integral circuit shown by the curve $f$ becomes lower than the saturation voltage, and a dead time $t_d$ results. This produces or accelerates an undesirable overshoot in automatic process control and good results of control cannot be obtained.

Referring to FIG. 6 showing operating waveforms of the proportional-integral circuit of the present invention provided with the limiter 30, the limiter 30 operates at time $t_1$ to deliver a limiter voltage $V_{LT}$ which varies abruptly as shown in FIG. 4. This limiter voltage $V_{LT}$ is applied through the operational amplifier A4 to the input terminal of the operational amplifier A2 in a polarity opposite to that of the input voltage $V_i$. Therefore, the charge stored in the capacitor C in the integrator discharges with the time constant which is determined by the capacitance of the capacitor C and the resistance of the resistor 15. As a result, the output voltage $V_{PI}$ of the operational amplifier A3 does not exceed ±11 volts and the limiter 30 ceases its operation. When, at this time, the input voltage $V_i$ is still applied in the same polarity as that appeared before the opeation of the limiter 30, the capacitor in the integrator is charged and $V_{PI}$ attains the level of ±11 volts again. Consequently, the limiter 30 is actuated again to restore $V_{PI}$ to within the range of ±11 volts. By virtue of such on-off control, $V_{PI}$ is maintained at the limiter operating voltage level of ±11 volts. When polarity inversion occurs in the input voltage $V_i$ at the time $t_2$, the proportional-integral action can be immediately started without producing any dead time. Thus, good results of control can be obtained without giving rise to an undesirable overshoot in automatic process control. Further, bumpless change-over from the handling mode to the automatic mode can be reliably carried out by any deviation input $V_i$ in spite of the fact that the circuit is simple in structure. Further, the provision of a limiter as shown in FIG. 3 is advantageous in that no leakage current flows below the limiter voltage and an ideal limiter characteristic can be obtained.

The limiter 30 shown in FIG. 3 is in no way limited to the illustrated structure, and any other suitable limiter, for example, the combination of a Zener diode and a polarity inverter may be employed to attain the same effect. Any suitable limiter means may be employed without departing from the scope of the present invention provided that it has the function of discriminating the exceeding of the output $V_{PI}$ of the adder beyond a predetermined voltage limit and the function of delivering a sufficiently large output of polarity opposite to the polarity of the adder output $V_{PI}$.

Figure 7:
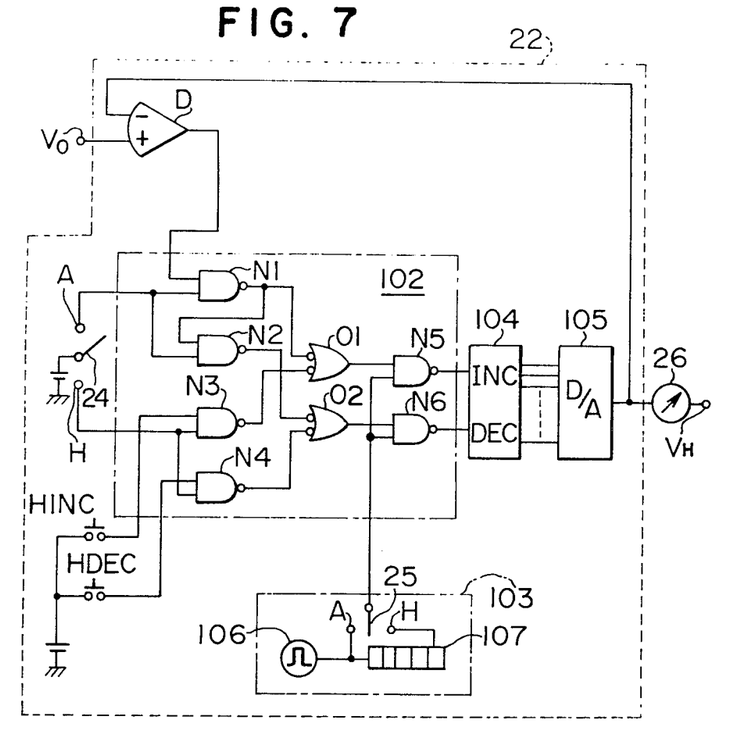
FIG. 7 is a circuit diagram showing the practical structure of one form of the manual handling source.

In FIGS. 1, 2 and 3, the manual handling source 22 is illustrated simply by a black box. This device is commonly known in the art and may have a structure as shown in FIG. 7. Referring to FIG. 7, the output $V_o$ of the proportional-integral circuit and the output $V_H$ of the manual handling source 22 are applied to a comparator D which compares these inputs to deliver a logical output 1 when $V_o > V_H$ and a logical output 0 when $H_H > V_o$. A change-over switch 24 is provided for change-over between the automatic mode A and the handling mode H, and when closed, a logical output 1 is applied to a logic circuit 102. NAND gates $N_1$ to $N_6$ in the logic circuit 102 deliver 0 only when the two inputs thereto are 1. NOR gates $O_1$ and $O_2$ deliver 0 when one of the two inputs thereto is 1. The reference numerals 103, 104 and 105 designate a pulse oscillator, a reversible counter having an up count terminal INC and a down count terminal DEC, and a digital to analog converter respectively. The symbols HINC and HDEC designate an up count switch and a down count switch respectively which are used in the handling mode and apply a logical output 1 to the suceeding circuit when closed.

The manual handling source 22 has a structure as above described. In the automatic mode, the change-over switch 24 is closed at the contact A. Suppose that $V_o > V_H$, then the output of the comparator D is 1 and the two inputs to the NAND gate $N_1$ are 1. Therefore, the output of the NAND gate $N_1$ is 0. Since one of the inputs to the NAND gate $N_2$ is applied from the NAND gate $N_1$, the logical output of the NAND gate $N_2$ is opposite to that of the NAND gate $N_1$ and is 1 in this case. The NOR gates $O_1$ and $O_2$ are connected at one of the input terminals thereof to the contact A of the switch 24 through the respective NAND gates $N_1$ and $N_2$ and at the other input terminal thereof to the contact H of the switch 24 through the respective NAND gates $N_3$ and $N_4$. Therefore, no logical inputs are applied simultaneously to both the input terminals of the NOR gates $O_1$ and $O_2$, and these NOR gates $O_1$ and $O_2$ act as a sign changer. Since the output of the NAND gate $N_1$ is 0 and the output of the NAND gate $N_2$ is 1, the output of the NOR gate $O_1$ is 1 and the output of the NOR gate $O_2$ is 0. The pulse output of the pulse oscillator 103 is applied to one input terminal of the NAND gates $N_5$ and $N_6$, and thus, a pulse output appears from these NAND gates $N_5$ and $N_6$ when 1 is applied to the other input terminal thereof. Since the output of the NOR gate $O_1$ is 1, the pulse signal is applied to the up count terminal INC of the reversible counter 104. The digital-analog converter 105 carries out digital-analog conversion of the input applied from the reversible counter 104 and delivers a digital-analog converted output. Such operation is carried out until $V_H$ becomes equal to $V_o$. The comparator output is 0 when $V_o < V_H$ in the automatic mode. In this case, the NAND gates $N_1$ and $N_2$ deliver logical outputs 1 and 0 respectively. The outputs of the NOR gates $O_1$ and $O_2$ in this case are 0 and 1 respectively, and the output of the pulse oscillator 103 is applied through the NAND gate $N_6$ to the down count terminal DEC of the reversible counter 104. Thus, $V_H$ is decreased until it becomes equal to $V_o$. According to this arrangement, however, the manual handling source 22 does not cease operation in the state in which $V_H$ coincides completely with $V_o$, and the increase and decrease of $V_H$ relative to $V_o$ is repeated although such increase and decrease is very slight. As a result, $V_H$ coincides substantially with $V_o$. In the automatic mode, $V_H$ follows up $V_o$ in the manner above described.

In the handling mode, the change-over switch 24 is closed at the contact H. The operator monitors the value of $V_H$ on a meter 26 and closes the up count switch HINC or down count switch HDEC until $V_H$ attains the desired value. Since the circuit including these switches HINC and HDEC has not any direct concern with the present invention and the operation in the handling mode is generally similar to that described with reference to the automatic mode, any detailed description is unnecessary.

The pulse oscillator 103 is composed of a pulse source 106, a frequency divider 107 and a mode change-over switch 25. Thus, when the mode change-over switch 25 is closed at the contact H in the handling mode, pulses having a frequency lower than that in the automatic mode are applied to the NAND gates $N_5$ and $N_6$. Therefore, the meter 26 gives a slower indication and the manipulation for increasing or decreasing $V_H$ by the operator or monitoring of $V_H$ on the meter 26 is facilitated.

Figure 8:
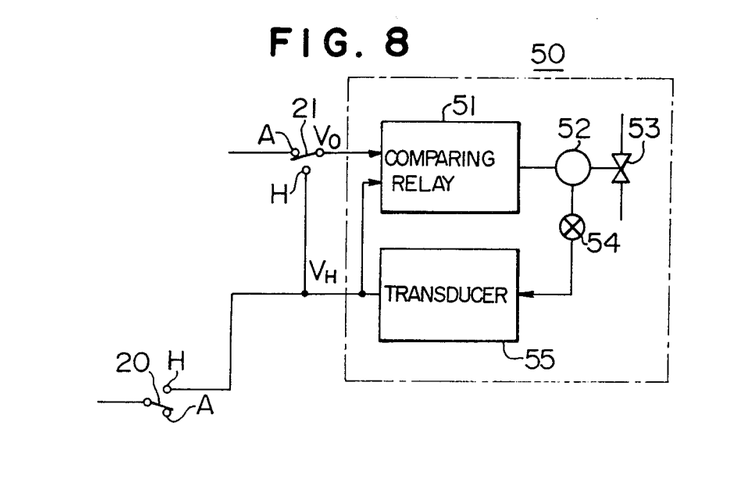
FIG. 8 is a circuit diagram showing the practical structure of another form of the manual handling source.

In lieu of the output voltage of the manual handling source 22 shown in FIG. 3, a feedback signal of a motor valve control device 50 controlled by the output voltage $V_o$ of the proportional-integral circuit may be utilized as shown in FIG. 8.

Referring to FIG. 8, a comparing relay 51 compares a feedback signal $V_H$ corresponding to the valve opening of a control valve 53 with the output voltage $V_o$ of the proportional-integral circuit to apply to an electric motor 52 an instruction signal instructing the foward or reverse rotation of the motor 52. A contactor may be combined with the relay 51 as required. A valve position sourcer 54 is, for example, a slide resistor. A resistance-voltage transducer 55 delivers a voltage $V_H$ proportional to the valve opening of the the control valve 53 in response to the application of the signal from the valve position sourcer 54. Therefore, this valve opening control device 50 controls $V_H$ so as to give the relation $V_o = V_H$, and the value of the output voltage $V_o$ of the proportional-integral circuit during the change-over from the automatic mode to the handling mode is memorized as the value of $V_H$. The effect is entirely the same as that described hereinbefore when the memorizing ability of the controlled element controlled by the output value of the proportional-integral circuit is utilized and the signal fed back from the controlled element is used in lieu of the output voltage of the manual handling source.

We claim:

1. A proportional-integral circuit provided with means for change-over between an automatic mode and a handling mode comprising an input signal $V_i$, an output signal $V_o$, a proportional means composed essentially of an operational amplifier for delivering an output proportional to said input signal $V_i$, an integrator composed essentially of an operational amplifier for integrating said input signal $V_i$, an adder means composed essentially of an operational amplifier for obtaining the sum of the output of said proportional means and the output of said integrator means, a manual handling source means delivering an output substantially equal to the output of said adder in the automatic mode and a manual handling signal in the handling mode, and means for alternately switching the source of said output signal $V_o$ between the output of said manual handling source means and said adder means, said proportional-integral circuit further comprising means for blocking application of said input signal $V_i$ to said integrator means when the handling mode is selected, means for applying the output of said proportional means and the output signal of said manual handling source means to the input terminal of said operational amplifier constituting the essential part of said integrator means when the handling mode is selected, and means for connecting a resistor across the input and output terminals of said operational amplifier constituting the essential part of said integrator means when the handling mode is selected, the gain of the output of said integrator means relative to the output of said proportional means and the output signal of said manual handling source means being selected to be $1/n$, and the gain of the output of said adder means relative to the output of said integrator means being selected to be n where n is greater than unity.

2. A proportional-integral circuit provided with means for change-over between an automatic mode and a handling mode as claimed in claim 1, wherein a limiter circuit means is connected across the output terminal of said adder means and the input terminal of said operational amplifier constituting the essential part of said integrator means and generates a sufficiently large output of polarity opposite to that of the output of said adder when the input applied from said adder exceeds a predetermined upper or lower limit.

3. A proportional-integral circuit provided with means for change-over between an automatic mode and a handling mode as claimed in claim 2, wherein said limiter circuit means comprises a first and a second series circuit each consisting of a diode and a resistor and connected at one end thereof to the output terminal of said adder means and at the other end thereof to the input terminal of a saturation type inverting operational amplifier, a voltage source means for applying a predetermined positive or negative voltage to the connection between the diode and the resistor in each of said first and second series circuits so as to normally maintain said diode non-conducting, a resistor connected across the input terminal and the output terminal of said saturation type operational amplifier, and a parallel circuit of diodes arranged in directions opposite to each other and connected at one end thereof to the input terminal of said operational amplifier constituting the esssential part of said integrator through a resistor and at the other end thereof to the output terminal of said saturation type operational amplifier.

4. A proportional-integral circuit provided with means for change-over between an automatic mode and a handling mode as claimed in claim 1, wherein said manual handling source means comprises a comparator means for comparing the output of said manual handling source means with the output of said adder means which is applied only in the automatic mode, a pulse oscillator means generating a pulse output, a reversible counter means having an up count terminal and a down count terminal for carrying out addition of pulses when the output of said pulse oscillator means is applied to said up count terminal and subtraction of pulses when the output of said pulse oscillator means is applied to said down count terminal, a digital-analog converter means for converting the digital output of said reversible counter means into an analog quantity, means for deciding the application of the output of said pulse oscillator means to said up count terminal or said down count terminal of said reversible counter means depending on the output of said comparator means when the automatic mode is selected, and means for applying the output of said pulse oscillator means to said up count terminal or said down count terminal of said reversible counter means in response to an up count or down count instruction signal issued by the operator when the handling mode is selected, the output of said digital-analog converter means being delivered as the output of said manual handling source means and the oscillation frequency of said pulse oscillator means in the handling mode being selected to be lower than that in the automatic mode.

\* \* \* \* \*